US008772722B2

(12) United States Patent
Noguchi et al.

(10) Patent No.: US 8,772,722 B2
(45) Date of Patent: Jul. 8, 2014

(54) TEMPERATURE SENSOR AND LIVING BODY DETECTOR USING TEMPERATURE SENSOR

(75) Inventors: Hidetaka Noguchi, Hyogo (JP); Hirofumi Watanabe, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 868 days.

(21) Appl. No.: 12/974,711

(22) Filed: Dec. 21, 2010

(65) Prior Publication Data

US 2011/0155913 A1    Jun. 30, 2011

(30) Foreign Application Priority Data

Dec. 28, 2009    (JP) ................. 2009-298728

(51) Int. Cl.
    *G01J 5/02*    (2006.01)
(52) U.S. Cl.
    CPC .......................... *G01J 5/02* (2013.01)
    USPC ................................................ 250/338.3
(58) Field of Classification Search
    CPC ........................................................ G01J 5/02
    USPC ................................... 250/338.3, 338.4
    See application file for complete search history.

(56) References Cited

U.S. PATENT DOCUMENTS

| 7,368,715 B2 | 5/2008 | Watanabe |
| 2001/0020844 A1 | 9/2001 | Andoh et al. |
| 2006/0163670 A1* | 7/2006 | Ellis-Monaghan et al. .. 257/388 |

FOREIGN PATENT DOCUMENTS

| JP | 11-108754 | 4/1999 |
| JP | 2001-284464 | 10/2001 |
| JP | 2007-101213 | 4/2007 |

OTHER PUBLICATIONS

Japanese official action dated Nov. 19, 2013 in corresponding Japanese patent application No. 2009-298728.
Hirobumi Watanabe, "CMOS Voltage Reference Based on Gate Work Function Differences in Poly-Si Controlled by Conductivity Type and Impurity Concentration", IEEE Journal of Solid-State Circuits, Jun. 2003, vol. 38, No. 6, p. 987-994.

* cited by examiner

*Primary Examiner* — David Porta
*Assistant Examiner* — Faye Boosalis
(74) *Attorney, Agent, or Firm* — Cooper & Dunham LLP

(57) ABSTRACT

Disclosed is a temperature sensor using a work-function-difference-based radiant-ray detecting element that outputs, as a detecting signal of radiant rays, a work function difference between gate electrodes of first and second field-effect transistors sensing the radiant rays. The temperature sensor includes at least a pair of a first work-function-difference-based radiant-ray detecting element having a positive output temperature coefficient; and a second work-function-difference-based radiant-ray detecting element having a negative output temperature coefficient of which an absolute value is equal to an absolute value of the output temperature coefficient of the first work-function-difference-based radiant-ray detecting element.

12 Claims, 22 Drawing Sheets

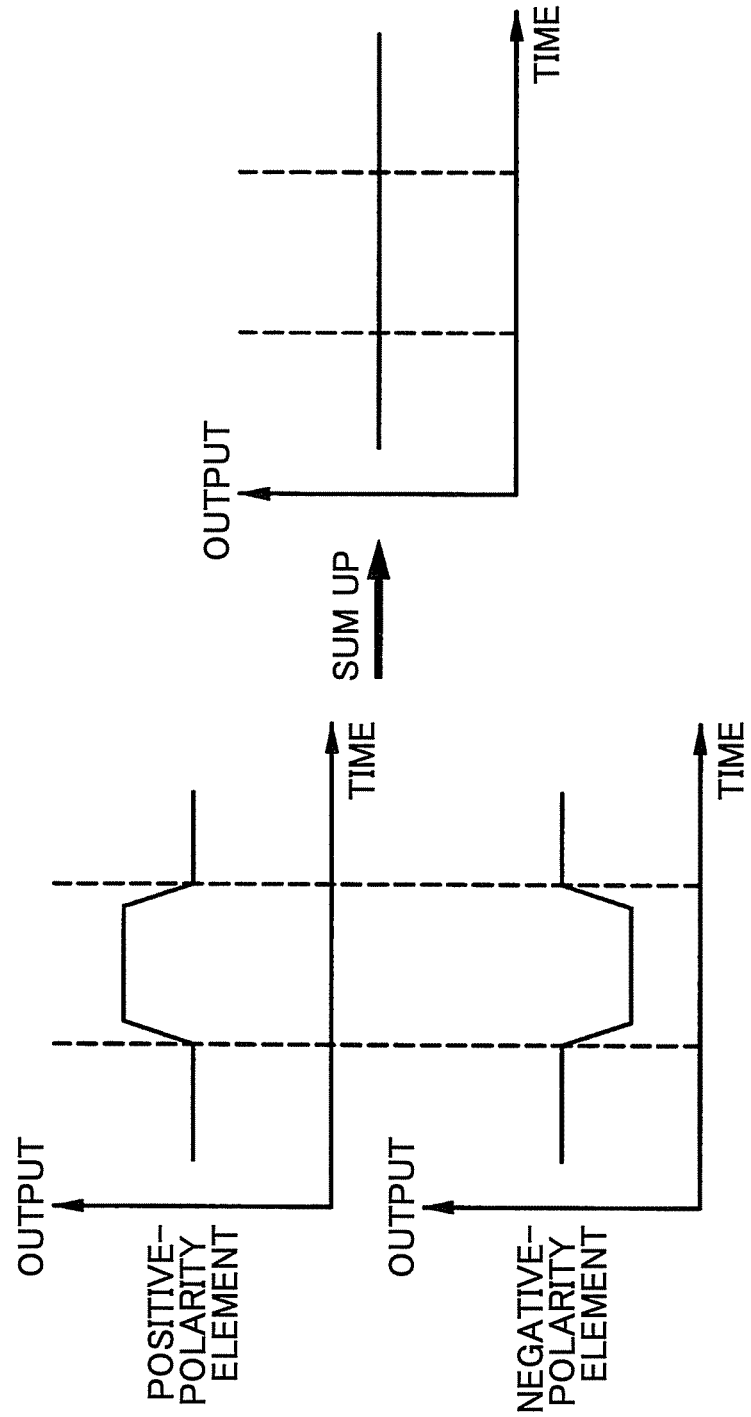

TEMPERATURE SENSOR AND LIVING BODY DETECTOR USING TEMPERATURE SENSOR

BACKGROUND OF THE INVENTION

1. Field of the Invention

The present invention relates to technologies for detecting radiant rays, for example, infrared rays emitted from a human body or the like, and in particular, to a technology suitable for detecting a still living body with a simple structure and high precision while preventing erroneous detection due to thermal interference.

2. Description of the Related Art

To detect a living body according to variations in heat emitted from the living body such as a human body, a known technology uses a sensor element such as a pyroelectric element, a thermopile, a bolometer, and a thermistor.

A pyroelectric element (hereinafter this infrared-ray detecting element is referred to as an AC infrared-ray detecting element) is a non-contact temperature sensor that detects variations in the amount of heat generated when a human body enters. On the other hand, an infrared-ray detecting element (hereinafter the infrared-ray detecting element is referred to as a DC infrared-ray detecting element) such as a thermopile and a thermistor is a non-contact temperature sensor that detects the amount of heat emitted from a human body.

Accordingly, the AC infrared-ray detecting element does not output a signal and cannot detect a human body if the human body is standing still and variations in the amount of heat are not detected. On the other hand, the DC infrared-ray detecting element outputs a signal according to the amount of heat emitted from a human body and thus can detect the human body even if the human body is standing still.

A technology of an infrared-ray human body detecting sensor using such a DC infrared-ray detecting element is disclosed in Patent Document 1. That is, Patent Document 1 discloses the technology that uses a pair of a positive-polarity infrared-ray sensor and a negative-polarity infrared-ray sensor to prevent erroneous detection due to thermal interference. Thus, this technology prevents erroneous detection in which thermal interference, such as temperature variations in the sensor itself and uniform temperature variations in a detection range, is detected as being caused by a human body.

Specifically, the multi-element human body detecting sensor disclosed in Patent Document 1 has at least a pair of the positive-polarity and negative-polarity infrared-ray sensors. By calculating a total sum of the output voltages of the infrared-ray sensors, the human-body detecting sensor can prevent the erroneous detection due to the thermal interference.

However, the human body detecting sensor disclosed in Patent Document 1, which uses a pyroelectric element, a thermopile, or a thermistor as the positive-polarity and negative-polarity infrared-ray sensor, has the following problems. A first problem accompanying the use of the pyroelectric element is that a chopper is required to detect a still living body. A second problem accompanying the use of the thermopile is that a heat insulating property is poor and sensitivity becomes low because a hot junction and a cold junction are connected to each other by the material of the thermopile. A third problem accompanying the use of the bolometer or the thermistor is that it is hard to equalize the absolute values of positive and negative output temperature coefficients because the positive-polarity and negative-polarity sensors are required to be made of the same material.

Further, for the purpose of detecting a temperature with high precision using a sensor taking the shape of a monolithic integrated circuit, Patent Document 2 discloses a work-function-difference-based temperature sensor that is composed of plural MOSFETs and uses the temperature characteristic of a work function difference between the gate electrodes of the respective MOSFETs; and a work-function-difference-based infrared-ray sensor and a human-body detecting sensor to which the work-function-difference-based temperature sensor is applied. Note that a work function is energy necessary for extracting one free electron in a solid object from a substance at 0 K, which is expressed in terms of a potential difference (V) and refers to the absolute value of the energy of a Fermi level measured when the energy level of electrons in vacuum is zero.

However, the technology disclosed in Patent Document 2 cannot prevent the erroneous detection in which the thermal interference, due to temperature variations in the sensor itself and uniform temperature variations in a detection range, is detected as being caused by a human body or the like.

According to the conventional technologies, it is not possible to easily manufacture a sensor that detects a still living body with a simple structure and high precision while preventing the erroneous detection due to the thermal interference.

Patent Document 1: JP-A-11-108754
Patent Document 2: JP-A-2007-101213

SUMMARY OF THE INVENTION

In light of the above problems, the present invention may have an object of manufacturing a high-precision and small-sized temperature sensor at low cost.

According to an aspect of the present invention, there is provided a temperature sensor using a work-function-difference-based radiant-ray detecting element that outputs, as a detecting signal of radiant rays, a work function difference between gate electrodes of first and second field-effect transistors sensing the radiant rays. The temperature sensor includes at least a pair of a first work-function-difference-based radiant-ray detecting element having a positive output temperature coefficient; and a second work-function-difference-based radiant-ray detecting element having a negative output temperature coefficient of which an absolute value is equal to an absolute value of the output temperature coefficient of the first work-function-difference-based radiant-ray detecting element.

Other objects, features and advantages of the present invention will become more apparent from the following detailed description when read in conjunction with the accompanying drawings.

BRIEF DESCRIPTION OF THE DRAWINGS

FIG. 3 is an explanatory diagram showing an example of preventing erroneous detection due to interference by using the human-body detecting sensor shown in FIGS. 1 and 2;

DETAILED DESCRIPTION OF THE PREFERRED EMBODIMENTS

Next, referring to the accompanying drawings, a description is made of a mode example for carrying out an embodiment of the present invention. This example is directed to a multi-element human-body detecting sensor that uses a pair of a positive-polarity infrared-ray sensor and a negative-polarity infrared-ray sensor to prevent erroneous detection in which thermal interference, such as temperature variations in the sensor itself and uniform temperature variations in a detection range, is detected as being caused by human bodies. In particular, a work-function-difference-based infrared-ray sensor is applied to this example.

Specifically, the positive-polarity infrared-ray sensor and the negative-polarity infrared-ray sensor are separately manufactured according to whether the connecting order of MOSFETs constituting the work-function-difference-based infrared-ray sensor is changed or whether the MOSFETs constituting the sensor are composed of either NMOS transistors or PMOS transistors.

Moreover, the output temperature coefficient of the work-function-difference-based infrared-ray sensor is determined based on a work function difference between the polysilicon gates of the plural MOSFETs constituting the sensor. Therefore, controlling the ion implantation of impurities into the polysilicon gates of the plural MOSFETs constituting the sensor equalizes the absolute values of the output temperature coefficients of the positive-polarity and negative-polarity sensors.

Since the work-function-difference-based infrared-ray sensor is of a DC type that detects the amount of incident infrared-rays, it is capable of detecting still human bodies.

Further, since the work-function-difference-based infrared-ray sensor is not required to have a hot junction and a cold junction, it is capable of obtaining a high heat insulating property.

Next, a description is made of a brief summary of the technology disclosed in Patent Document 1, i.e., a multi-element human-body detecting sensor that uses a pair of a positive-polarity infrared-ray sensor and a negative-polarity infrared-ray sensor and prevents erroneous detection in which thermal interference such as temperature variations in the sensor itself and uniform temperature variations in a detection range is detected as being caused by human bodies.

Figure 1:
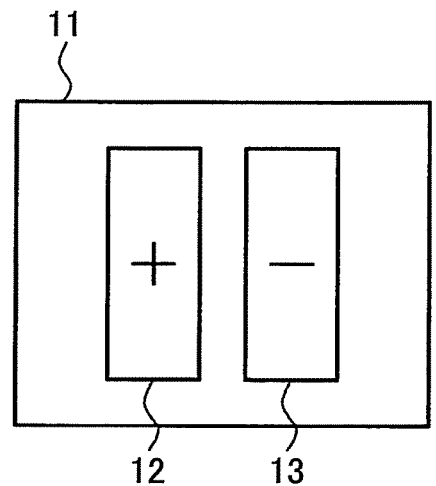
FIG. 1 is a block diagram showing a first configuration example of a conventional element-type human-body detecting sensor.
Figure 2:
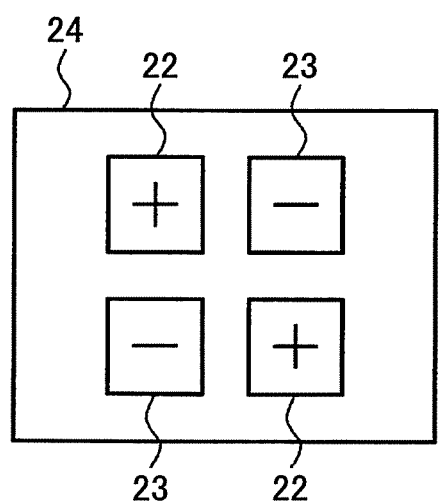
FIG. 2 is a block diagram showing a second configuration example of the conventional element-type human-body detecting sensor.

FIG. 1 shows the configuration of the element part of a two-element human-body detecting sensor, and FIG. 2 shows the configuration of the element part of a four-element human-body detecting sensor.

As shown in FIGS. 1 and 2, an infrared-ray detecting element part 11 has an infrared-ray sensor 12 having a positive output temperature coefficient and an infrared-ray sensor 13 having a negative output temperature coefficient, while an infrared-ray detecting element part 24 has two of the infrared-ray sensors 12 having a positive output temperature coefficient and two of the infrared-ray sensors 13 having a negative output temperature coefficient. Note that the infrared-ray detecting element parts 11 and 24 may have five or more of the infrared-ray sensors.

Since a specific principle of the human-body detecting sensor is described in Patent Document 1, it is omitted here. Instead, a brief description of the human-body detecting sensor is made referring to FIG. 3.

When the temperature of the human-body detecting sensor itself is raised or the temperature of the entirety of a floor surface, a wall surface, or the like in a detection range is uniformly raised due to an influence by an air conditioner, sun light, or the like, output variations simultaneously occur in a positive-polarity element and a negative-polarity element. The output variations in the positive-polarity and negative-polarity elements are cancelled when being summed up. As a result, it is possible to solve a problem in which the output variations due to an air conditioner or sun light is detected as being caused by human bodies.

On the other hand, in this example, the multi-element human-body detecting sensor is composed of the work-function-difference-based infrared-ray sensor having a positive-polarity output and the work-function-difference-based infrared-ray sensor having a negative-polarity output. Conventionally, the multi-element human-body detecting sensor using the work-function-difference-based infrared-ray sensors has not been presented.

Further, for example, the output of a conventional pyroelectric infrared-ray sensor is varied only when the amount of incident infrared rays vary. Therefore, a chopper or the like is additionally required to detect still human bodies in a sensor detection range.

On the other hand, since the work-function-difference-based temperature sensor used in this example can detect the absolute value of a difference between a steady state and a transient state, it is also capable of detecting still human bodies.

Further, in order to obtain positive-polarity and negative-polarity outputs with a bolometer, a thermistor, or the like according to a conventional technology, a sensor is required to be made of different materials, and it is very hard to match the absolute values of positive and negative output temperature coefficients to each other.

On the other hand, the work-function-difference-based infrared-ray sensor used in this example is a so-called thermal infrared-ray sensor, and detects temperature variations due to the absorption of infrared rays by the work-function-difference-based temperature sensor.

Next, a description is made of the work-function-difference-based temperature sensor serving as the core of the work-function-difference-based infrared-ray sensor.

Figure 4A:
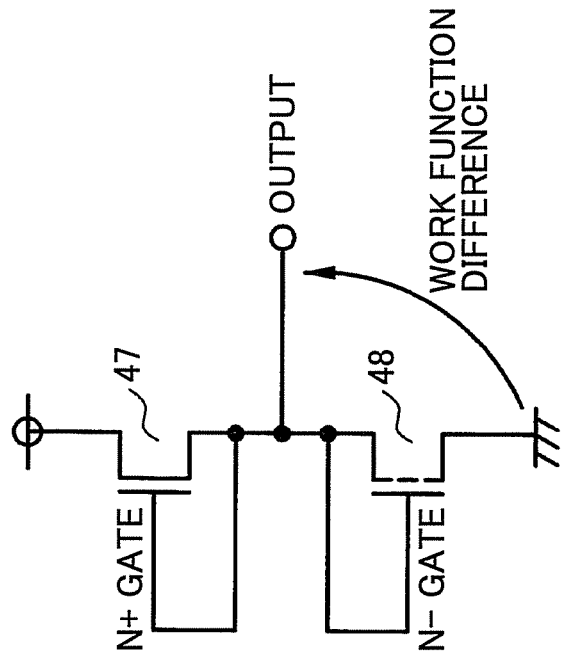
FIGS. 4A and 4B are block diagrams showing a circuit configuration example of a conventional work-function-difference-based temperature element composed of NMOS transistors.

FIG. 4A shows an example of the configuration of the work-function-difference-based temperature sensor composed of NMOS transistors.

The work-function-difference-based temperature sensor shown in FIG. 4A is composed of two MOSFETs including an NMOS transistor 45 and an NMOS transistor 46. The NMOS transistor 45 is a depletion type, while the NMOS transistor 46 is an enhancement type.

Further, the gates of the NMOS transistor 45 and the NMOS transistor 46 are designed to have different work functions. For example, in FIG. 4A, the gate of the NMOS transistor 45 is an N+ polysilicon gate, while the gate of the NMOS transistor 46 is a P+ polysilicon gate.

When these MOSFETs are connected to each other in a manner shown in FIG. 4A, the NMOS transistor 45 serves as a current source and a work function difference between the gate electrodes of the NMOS transistor 45 and the NMOS transistor 46 is output from an output terminal. Note that since the operations of this configuration are specifically described in Patent Document 2, their descriptions are omitted here.

Figure 4B:
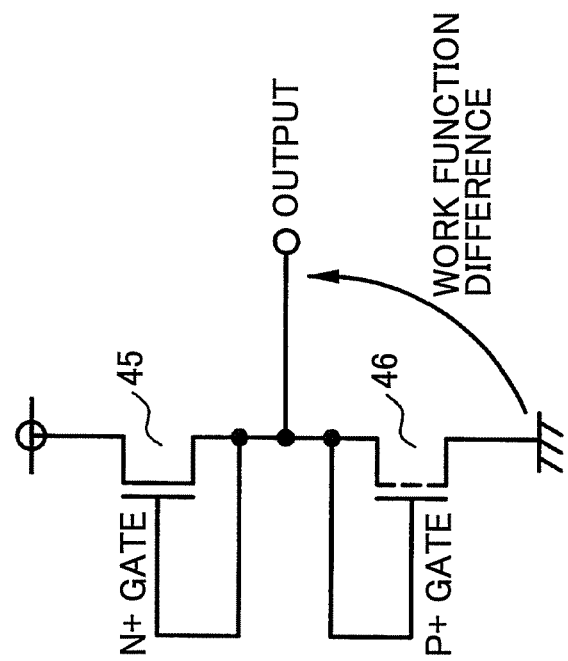

Further, as shown in FIG. 4B, the gate of an NMOS transistor 47 may be an N+ polysilicon gate, while the gate of an NMOS transistor 48 may be an N-polysilicon gate. In this case, the NMOS transistor 48 may be a depletion type. However, the threshold voltage of the NMOS transistor 48 is greater than that of the NMOS transistor 47, and the NMOS transistor 47 serves as a current source.

Figure 5:
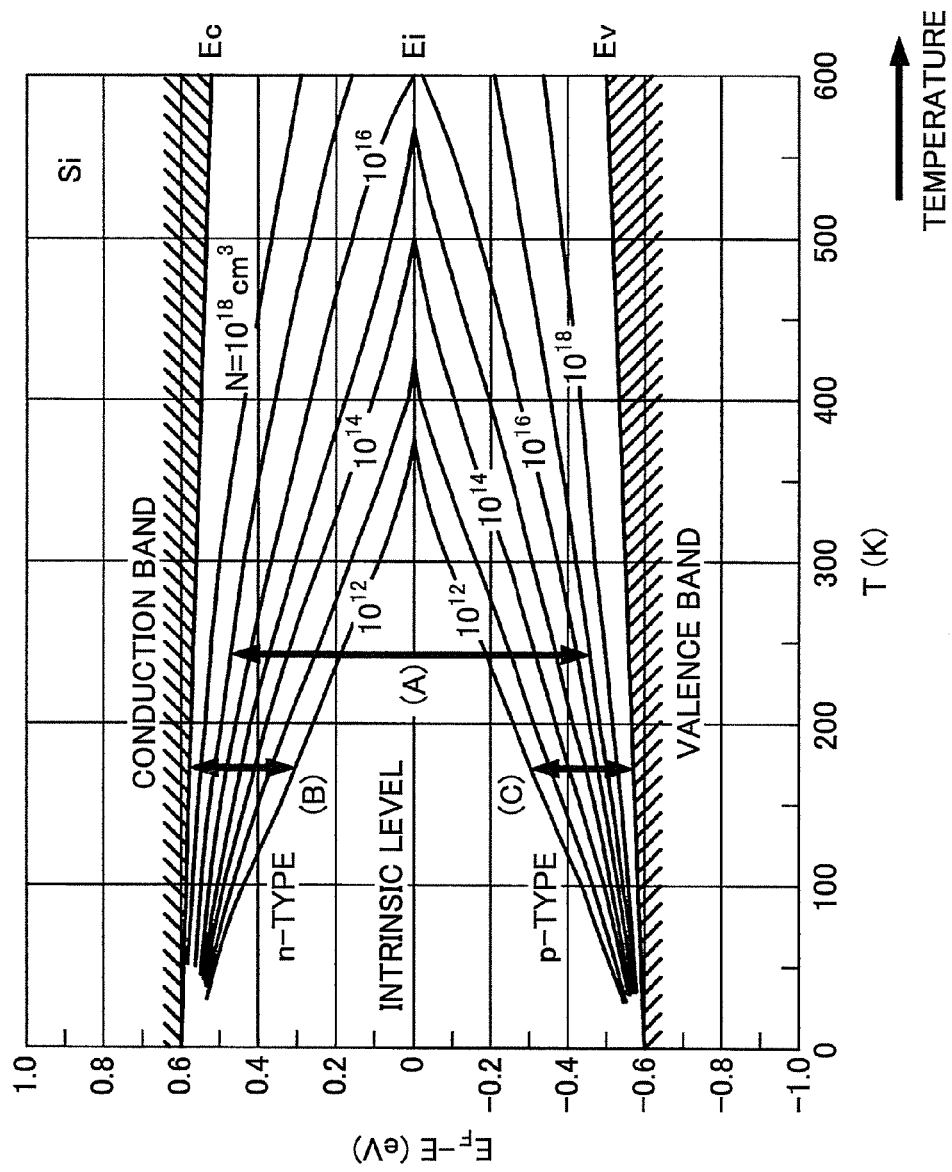
FIG. 5 is an explanatory diagram showing an example of output temperature characteristics of the conventional work-function-difference-based temperature element shown in FIG. 4.

Here, a description is made of temperature characteristics in the output of a work function difference. FIG. 5 shows a relationship between the Fermi level of Si, temperature, and impurity concentration.

First, as shown in FIG. 4A, when the gate of the NMOS transistor 45 is an N+ polysilicon gate while the gate of the NMOS transistor 46 is a P+ polysilicon gate, i.e., when the conductivity types of the polysilicon gates of the MOSFETs constituting the work-function-difference-based temperature sensor are different, the output of a work function difference shows the characteristic as indicated by (A) in FIG. 5 and has a negative output temperature coefficient with respect to the temperature.

On the other hand, as shown in FIG. 4B, when the gate of the NMOS transistor 47 is an N+ polysilicon gate while the gate of the NMOS transistor 48 is an N− polysilicon gate, i.e., when the conductivity types of the polysilicon gates of the MOSFETs constituting the work-function-difference-based temperature sensor are the same but their impurity concentrations are different, the output of a work function difference shows the characteristic as indicated by (B) in FIG. 5 and has a positive output temperature coefficient with respect to the temperature.

Thus, changing the conductivity types or the impurity concentrations of the polysilicon gates makes it possible to manufacture the work-function-difference-based temperature sensor having either a positive or negative output temperature coefficient.

In this state, however, since the absolute values of the positive and negative output temperature coefficients are different, thermal interference cannot be prevented.

Therefore, as a technology for manufacturing the work-function-difference-based temperature sensor having the same absolute values of negative and positive output temperature coefficients, a description is made of the technology in which the connection of the transistors is changed.

Figure 6:
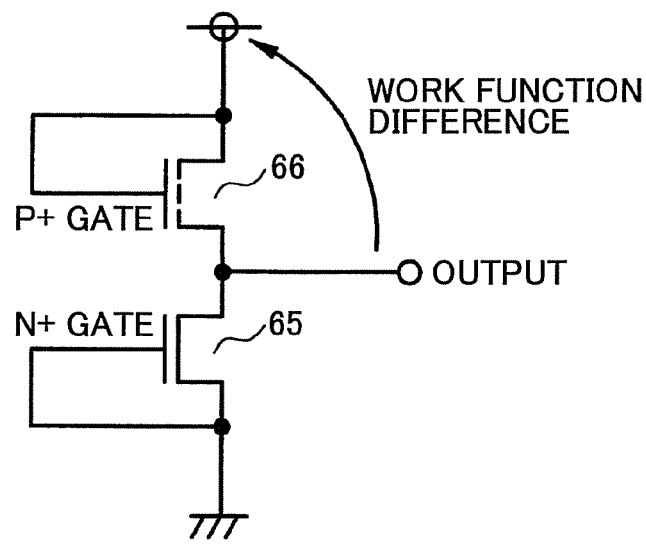
FIG. 6 is a block diagram showing a circuit configuration example of a work-function-difference-based radiant-ray detecting element composed of NMOS transistors used in a temperature sensor according to an embodiment of the present invention.

FIG. 6 shows the work-function-difference-based temperature sensor different in configuration from the work-function-difference-based temperature sensor shown in FIG. 4A.

The transistors shown in FIGS. 4A and 6 are the same.

In the case of the work-function-difference-based temperature sensor shown in FIG. 4A, the depletion-type NMOS transistor 45 serving as the current source is connected to a power source, while the NMOS transistor 46 for outputting a work function difference is connected to ground. The output of a work function difference is based on ground as shown in FIG. 4A.

On the other hand, in the case of the work-function-difference-based temperature sensor shown in FIG. 6, a depletion-type NMOS transistor 65 serving as a current source is connected to ground, while an NMOS transistor 66 for outputting a work function difference is connected to a power source. A work function difference is output between an output terminal and the power source as indicated by an arrow in FIG. 6.

Figure 7:
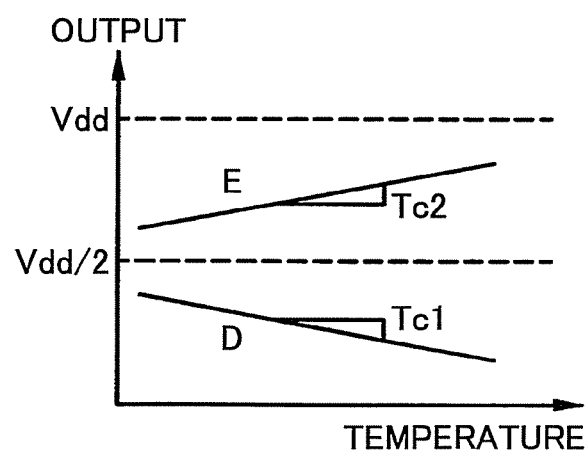
FIG. 7 is an explanatory diagram showing an example of output temperature characteristics of the work-function-difference-based radiant-ray detecting element according to the embodiment of the present invention in FIG. 6.

FIG. 7 shows the output temperature characteristics of the work-function-difference-based temperature sensor.

In FIG. 7, D indicates the characteristic of the work-function-difference-based temperature sensor shown in FIG. 4A, while E indicates the characteristic of the work-function-difference-based temperature sensor shown in FIG. 6.

In the case of the work-function-difference-based temperature sensors having the different conductivity types of the gates shown in FIGS. 4A and 6, a work function difference shows the negative temperature characteristic as illustrated in FIG. 5.

In the case of the configuration of the work-function-difference-based temperature sensor shown in FIG. 4A, a work function difference is output based on ground. Therefore, as indicated by D in FIG. 7, the negative characteristic of the work function difference directly appears as the output of the sensor.

On the other hand, in the case of the configuration of the work-function-difference-based temperature sensor shown in FIG. 6, a work function difference is output between the output terminal and the power source. Therefore, the output of the sensor shows the positive temperature characteristic as indicated by E in FIG. 7.

Assuming that the output temperature coefficient of D is Tc1 and the output temperature coefficient of E is Tc2, the relationship |Tc1|=|Tc2| is established. This is because the output temperature coefficient Tc1 of D and the output temperature coefficienct Tc2 of E are determined only by work function differences between the NMOS transistors 45 and 65 and the NMOS transistors 46 and 66.

That is, between the sensors shown in FIGS. 4A and 6, the connecting configurations of the MOSFETs are different but the work function differences of the gates are the same. Therefore, the absolute values of output temperature coefficients become equal.

As described above, changing the connecting configurations of the work-function-difference-based temperature sensors makes it possible to manufacture the positive-polarity or negative-polarity work-function-difference-based temperature sensor having the same absolute values of output temperature coefficients.

Note that the above is a description of the work-function-difference-based temperature sensor composed of the NMOS transistors having the different gate conductivity types. However, changing the connecting order of the current source transistor and the output transistor makes it possible to manufacture the positive-polarity or negative-polarity work-function-difference-based temperature sensor having the same absolute values of output temperature coefficients in the cases of the work-function-difference-based temperature sensor composed of the NMOS transistors having the different impurity concentrations of the gates, the work-function-difference-based temperature sensor composed of the PMOS transistors having the different conductivity types of the gates, and the work-function-difference-based temperature sensor composed of the PMOS transistors having the different impurity concentrations.

Next, as a technology for manufacturing the work-function-difference-based temperature sensors having the same absolute values of positive and negative output temperature coefficients, a description is made of the technology that uses MOSFETs different in their channel conductivity types.

Figure 8B:
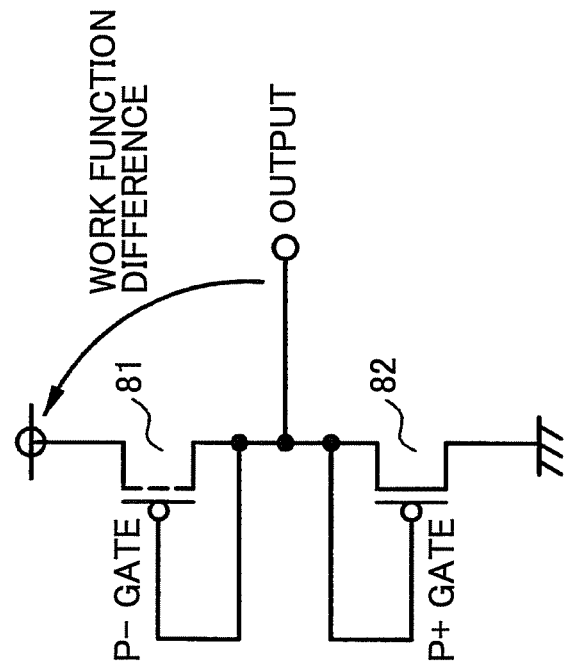
FIGS. 8A and 8B are block diagrams showing a circuit configuration example of a work-function-difference-based radiant-ray detecting element composed of PMOS transistors used in the temperature sensor according to the embodiment of the present invention.
Figure 8A:
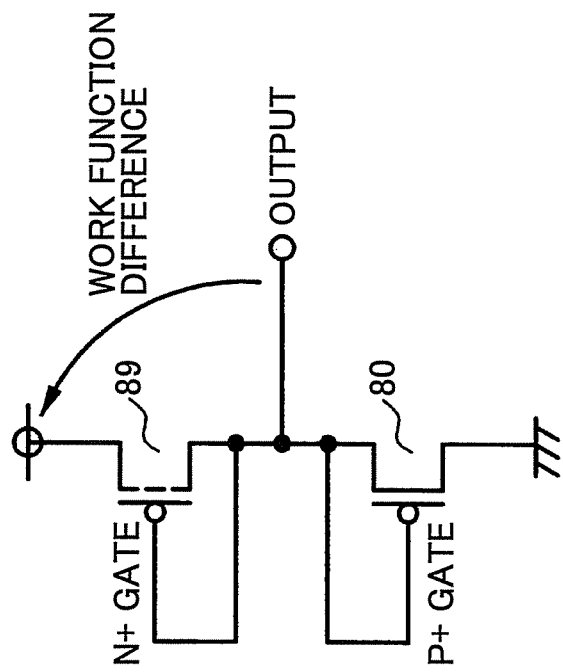

FIG. 8 shows an example of the configuration of the work-function-difference-based temperature sensor composed of PMOS transistors. The work-function-difference-based temperature sensor shown in FIG. 8A is composed of two MOSFETs including a PMOS transistor 89 and a PMOS transistor 80.

The work-function-difference-based temperature sensor shown in FIG. 8A is configured to have different conductivity types of gates. That is, the gate of the PMOS transistor 89 is an N+ polysilicon gate, while the gate of PMOS transistor 80 is a P+ polysilicon gate. The PMOS transistor 89 is an enhancement type, while the PMOS transistor 80 is a depletion type.

The PMOS transistor 80 serves as a current source, and a work function difference between the gate electrodes of the PMOS transistor 89 and the PMOS transistor 80 is output from an output terminal.

The work-function-difference-based temperature sensor shown in FIG. 8B shows an example of the configuration in which the conductivity types of gates are the same but their impurity concentrations are different. For example, the gate of the PMOS transistor 81 may be a P– polysilicon gate, while the gate of the PMOS transistor 82 may be a P+ polysilicon gate. Of course, the impurity concentrations may be changed by N-type polysilicon.

The feature of the work-function-difference-based temperature sensor composed of the PMOS transistors is that a work function difference is output between a power source and an output terminal.

Figure 9:
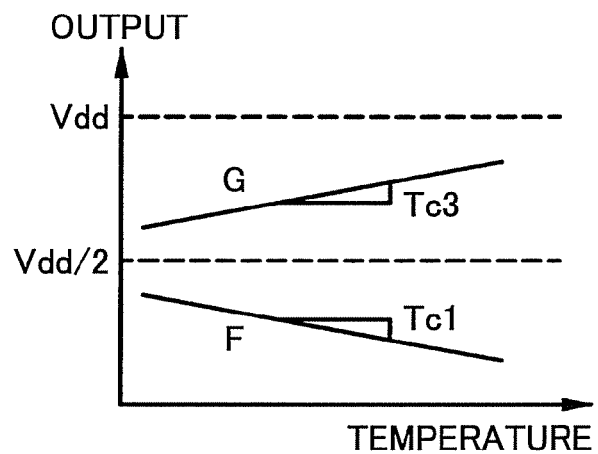
FIG. 9 is an explanatory diagram showing an example of a first output temperature characteristic of the work-function-difference-based radiant-ray detecting element according to the embodiment of the present invention in FIG. 8.

FIG. 9 shows the output temperature characteristics of the work-function-difference-based temperature sensors having different gate conductivity types.

In FIG. 9, F indicates the characteristic of the work-function-difference-based temperature sensor composed of the NMOS transistors shown in FIG. 4A, while G indicates the characteristic of the work-function-difference-based temperature sensor composed of the PMOS transistors shown in FIG. 8A.

In the case of the configuration of the work-function-difference-based temperature sensor shown in FIG. 8A, the temperature characteristic in the output of a work function difference shows a negative characteristic (the characteristic shown in FIG. 5A) as in the case of the configuration of the work-function-difference-based temperature sensor shown in FIG. 4A. However, in the case of the configuration of the work-function-difference-based temperature sensor composed of the PMOS transistors shown in FIG. 8A, a work function difference is output between a power source and the output terminal. Therefore, the output of the sensor shows the positive output temperature characteristic as indicated by G in FIG. 9.

Further, assuming that the output temperature coefficient of the output temperature characteristic G shown in FIG. 9 is Tc3, the relationship |Tc1|=|Tc3| is established. This is because the temperature characteristic of a work function difference is determined only by a work function difference between the respective gates.

In other words, the relationship |Tc1|=|Tc3| can be achieved by controlling the step of implanting impurities such that a work function difference between the gate electrodes of the NMOS transistor 45 and the NMOS transistor 46 of the work-function-difference-based temperature sensor shown in FIG. 4A becomes equal to a work function difference between the PMOS transistor 89 and the PMOS transistor 80 of the work-function-difference-based temperature sensors shown in FIG. 8A.

Meanwhile, the N+ polysilicon gates of the NMOS transistor 45 and the PMOS transistor 89 are formed in the same ion implantation step, and the P+ polysilicon gates of the NMOS transistor 46 and the PMOS transistor 80 are also formed in the same ion implantation step. Therefore, it is natural that the work function difference between the gate electrodes of the NMOS transistor 45 and the NMOS transistor 46 becomes equal to the work function difference between the gate electrodes of the PMOS transistor 89 and the PMOS transistor 80. Thus, the relationship |Tc1|=|Tc3| can be achieved in a simple step.

Figure 10:
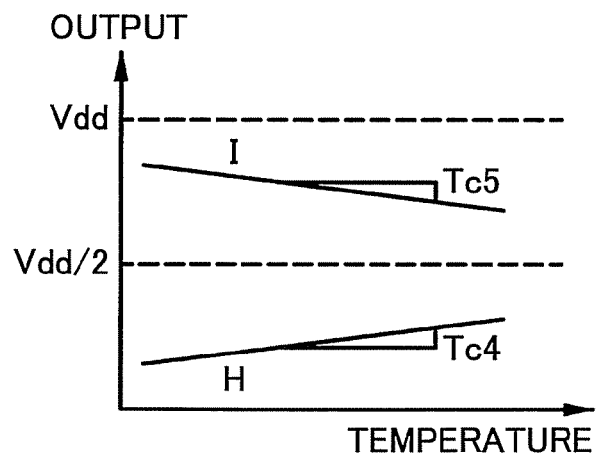
FIG. 10 is an explanatory diagram showing an example of a second output temperature characteristic of the work-function-difference-based radiant-ray detecting element according to the embodiment of the present invention in FIG. 8.

FIG. 10 shows the output temperature characteristics of the work-function-difference-based temperature sensors having the same gate conductivity types but different impurity concentrations.

In FIG. 10, H indicates the characteristic of the work-function-difference-based temperature sensor composed of the NMOS transistors shown in FIG. 4B, while I indicates the characteristic of the work-function-difference-based temperature sensor composed of the PMOS transistors shown in FIG. 8B.

In the case of the work-function-difference-based temperature sensors having different impurity concentrations, a work function difference shows the positive temperature characteristic like the characteristics (B) and (C) shown in FIG. 5. However, in the case of the work-function-difference-based temperature sensor composed of the PMOS transistors, a work function difference is output to the power source and the output terminal. Therefore, the output of the sensor shows the negative temperature characteristic as indicated by I in FIG. 10.

In this case also, the relationship |Tc4|=|Tc5| can be achieved by controlling the step of implanting impurities such that a work function difference between the gate electrodes of the NMOS transistor 47 and the NMOS transistor 48 of the work-function-difference-based temperature sensor shown in FIG. 4B is equal to a work function difference between the PMOS transistor 81 and the PMOS transistor 82 of the work-function-difference-based temperature sensor shown in FIG. 8B.

In particular, the relationship |Tc4|=|Tc5| can be more easily achieved if the gate conductivity types of the respective MOSFETs in the work-function-difference-based temperature sensors shown in FIGS. 4B and 8B are the same.

As described above, based on whether the MOSFETs constituting the work-function-difference-based temperature sensors are composed of either the NMOS transistors or the PMOS transistors, it is possible to manufacture the positive-polarity or negative-polarity work-function-difference-based infrared-ray sensor having the same absolute values of output temperature coefficients.

For example, a thermopile increases its sensitivity with thermocouples connected in series, but the work-function-difference-based infrared-ray sensor can also obtain the same result.

Next, a description is made of the work-function-difference-based temperature sensor having increased sensitivity with the connection of transistors in multistages.

Figure 11:
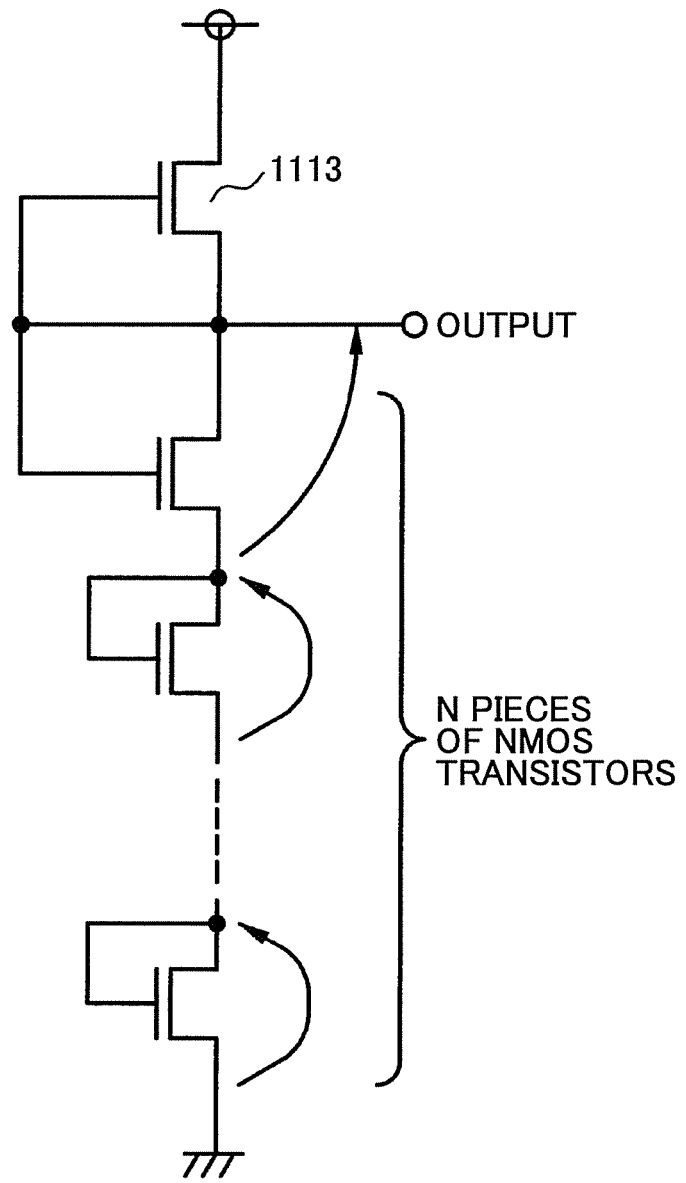
FIG. 11 is a block diagram showing a first circuit configuration example of a work-function-difference-based radiant-ray detecting element composed of NMOS transistors in multistages used in the temperature sensor according to the embodiment of the present invention.

FIG. 11 shows the work-function-difference-based temperature sensor composed of NMOS transistors in multistages. In FIG. 11, an NMOS transistor 1113 is a depletion type like the NMOS transistor 45 shown in FIG. 4A and serves as a current source. The other N NMOS transistors are either an enhancement type or a depletion type. Further, the N NMOS transistors other than the NMOS transistor 1113 have completely the same configuration.

With this connection of the NMOS transistors, it is possible to make the output temperature coefficient of the work-function-difference-based temperature sensor shown in FIG. 11 N times as large as the output temperature coefficient of the work-function-difference-based temperature sensor shown in FIG. 4A.

Figure 12:
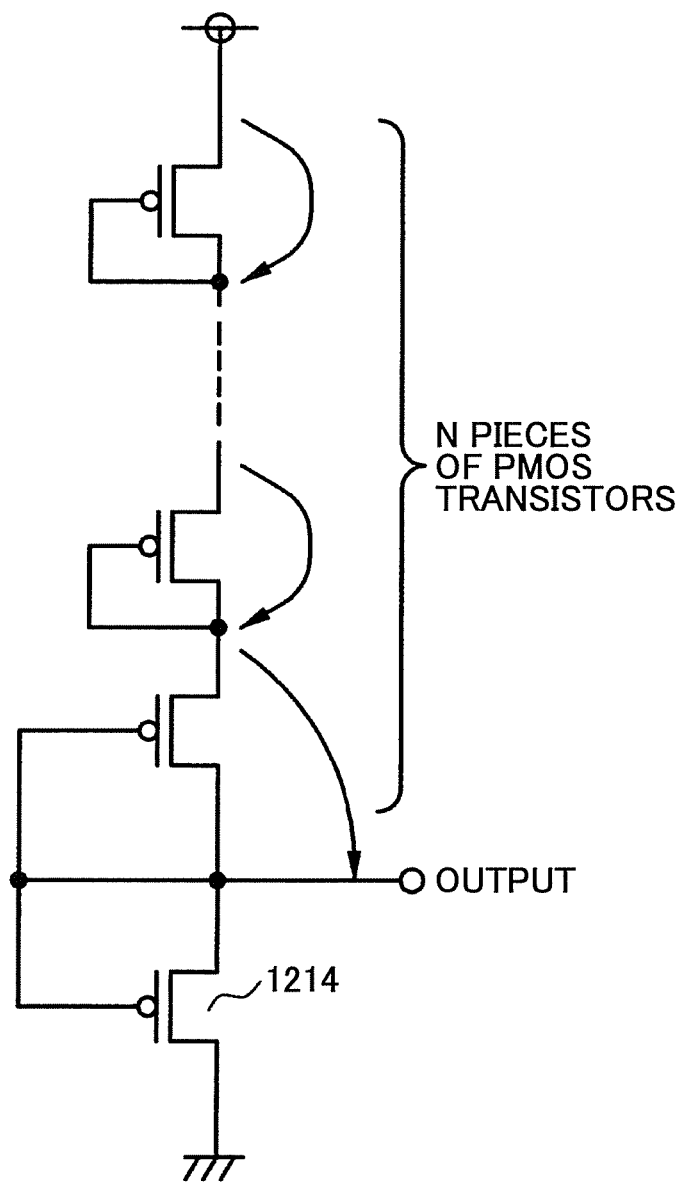
FIG. 12 is a block diagram showing a first circuit configuration example of a work-function-difference-based radiant-ray detecting element composed of NMOS transistors in multistages used in the temperature sensor according to the embodiment of the present invention.

FIG. 12 shows the work-function-difference-based temperature sensor composed of PMOS transistors in multistages. In FIG. 12, a PMOS transistor 1214 is a depletion type like the PMOS transistor 80 shown in FIG. 8A and serves as a current source. The other N PMOS transistors are either an enhancement type or a depletion type. Further, the N PMOS transistors other than the PMOS 1214 have completely the same configuration.

With this connection of the PMOS transistors, it is also possible to make the output temperature coefficient of the work-function-difference-based temperature sensor shown in FIG. 12 N times as large as the output temperature coefficient of the work-function-difference-based temperature sensor shown in FIG. 8A.

The gates of the work-function-difference-based temperature sensor may be configured such that conductivity types are different or the conductivity types are the same but impurity concentrations are different between the MOSFET of the depletion type and the other N MOSFETs.

The polarity of an output temperature coefficient is the same as the polarity shown in FIGS. 9 and 10.

Figure 13:
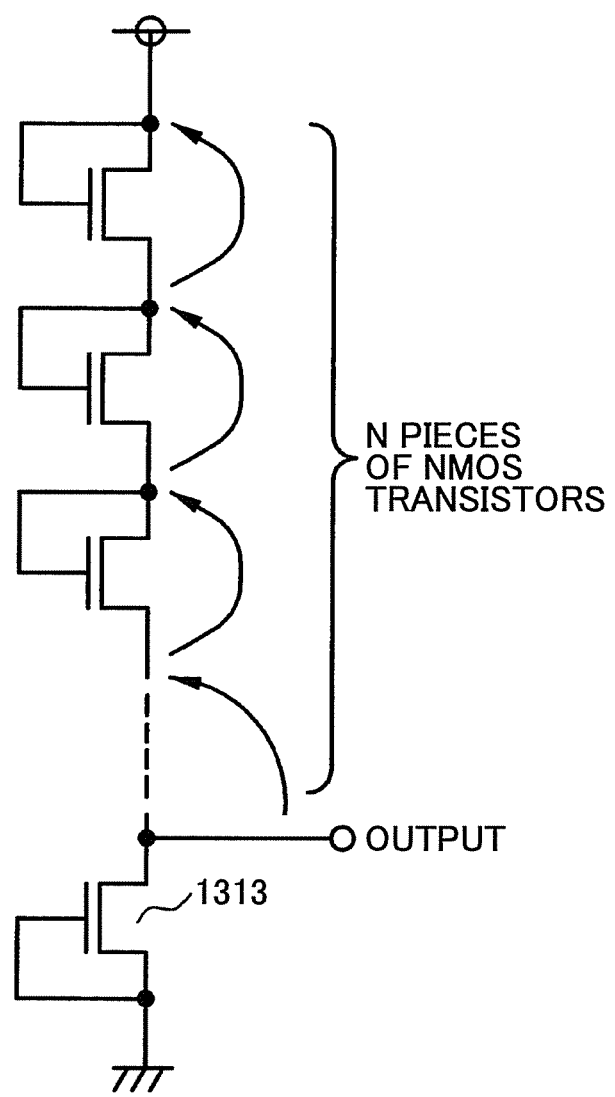
FIG. 13 is a block diagram showing a second circuit configuration example of a work-function-difference-based radiant-ray detecting element composed of NMOS transistors in multistages used in the temperature sensor according to the embodiment of the present invention.
Figure 14:
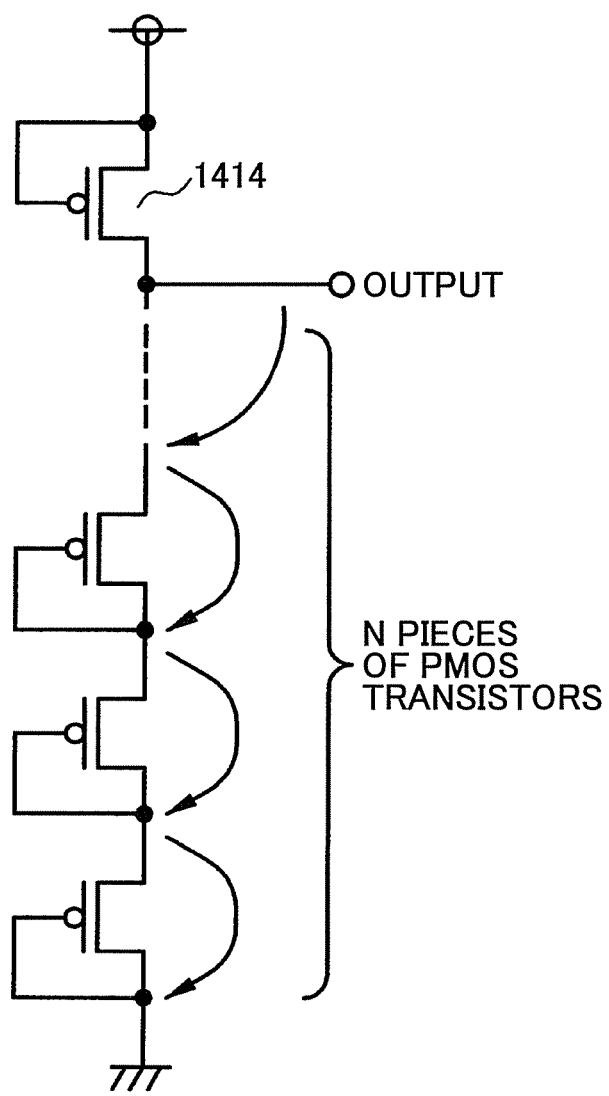
FIG. 14 is a block diagram showing a second circuit configuration example of the work-function-difference-based radiant-ray detecting element composed of the PMOS transistors in multistages used in the temperature sensor according to the embodiment of the present invention.

In order to manufacture the positive-polarity or negative-polarity work-function-difference-based temperature sensor, the connection between the MOSFETs is changed. That is, in the case of the work-function-difference-based temperature sensor shown in FIG. 11, the connection between the NMOS transistor 1113 and the other N NMOS transistors may be changed. Further, in the case of the work-function-difference-based temperature sensor shown in FIG. 12, the connection between the PMOS transistor 1214 and the other N PMOS transistors may be changed. FIGS. 13 and 14 show the circuit diagrams of these work-function-difference-based temperature sensors. In FIG. 13, N NMOS transistors other than a transistor NMOS 1313 are connected in multistages. Further, in FIG. 14, N PMOS transistors other than a PMOS transistor 1414 are connected in multistages.

Figure 15A:
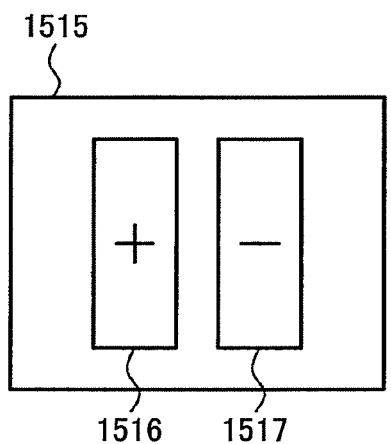
FIGS. 15A through 15C are explanatory diagrams showing the configuration and the operations example of the temperature sensor using a two-element work-function-difference-based radiant-ray detecting element according to the embodiment of the present invention.

FIG. 15A shows the configuration of a work-function-difference-based human-body detecting sensor having two elements. In FIG. 15A, the work-function-difference-based human-body detecting sensor 1515 is composed of a work-function-difference-based infrared-ray sensor 1516 having a positive output temperature coefficient and a work-function-difference-based infrared-ray sensor 1517 having a negative output temperature coefficient.

Note that the work-function-difference-based human-body detecting sensor 1515 shown in FIG. 15 has two elements but may have two or more elements.

Next, a description is made of a brief summary of human-body detection and a technology for preventing the erroneous detection of human bodies using the human-body detecting sensor shown in FIG. 15A.

Figure 15B:
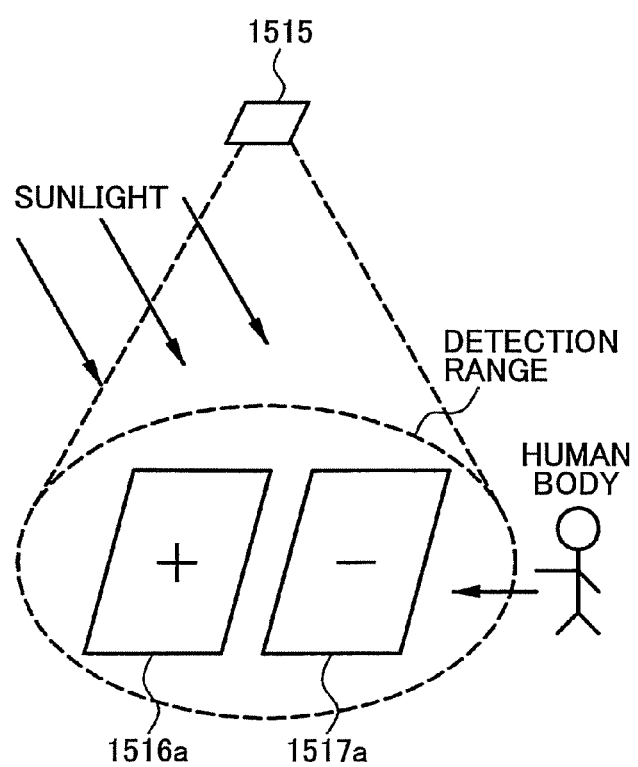

FIG. 15B shows a detection range by the human-body detecting sensor. In the detection range as indicated by dotted lines, the work-function-difference-based infrared-ray sensor 1516 having a positive output temperature coefficient detects an area 1516a, while the work-function-difference-based infrared-ray sensor 1517 having a negative output temperature coefficient detects an area 1517a.

Figure 15C:
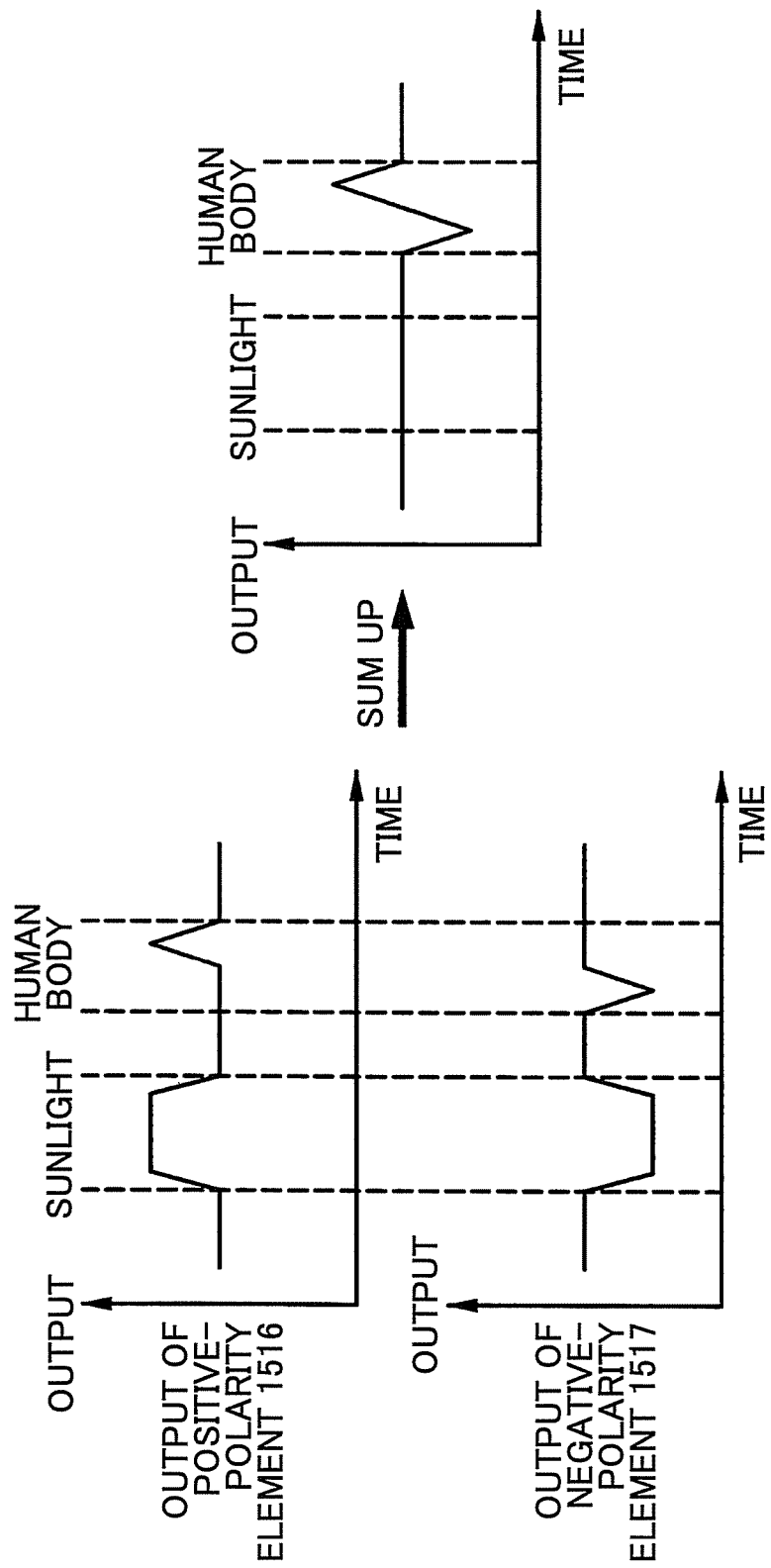

FIG. 15C shows the outputs of the respective work-function-difference-based infrared-ray sensors 1516 and 1517 and the sum of the outputs thereof when a human body passes through the detection range or when thermal interference occurs in the detection range.

When the entirety of the detection range is irradiated with sunlight as thermal interference, the output of the positive-polarity element increases while the output of the negative-polarity element decreases as shown in FIG. 15C.

Accordingly, when the outputs of these elements are summed up, output variations due to sunlight can be cancelled to thereby make it possible to prevent the erroneous detection of the human body due to the influence by sunlight.

On the other hand, since the human body first passes through the area 1517a and then passes through the area 1516a, there is a time difference between output variations in the negative-polarity element and the positive-polarity element.

Accordingly, the output variations in the respective sensors are not cancelled to thereby make it possible to detect the human body.

Note that the influence by sunlight is described as thermal interference in FIGS. 15B and 15C, but the human-body detecting sensor is also effective against thermal interference caused in an entire detection range such as an influence by a hot air blown from an air conditioner or thermal interference caused in the sensor itself.

Figure 16:
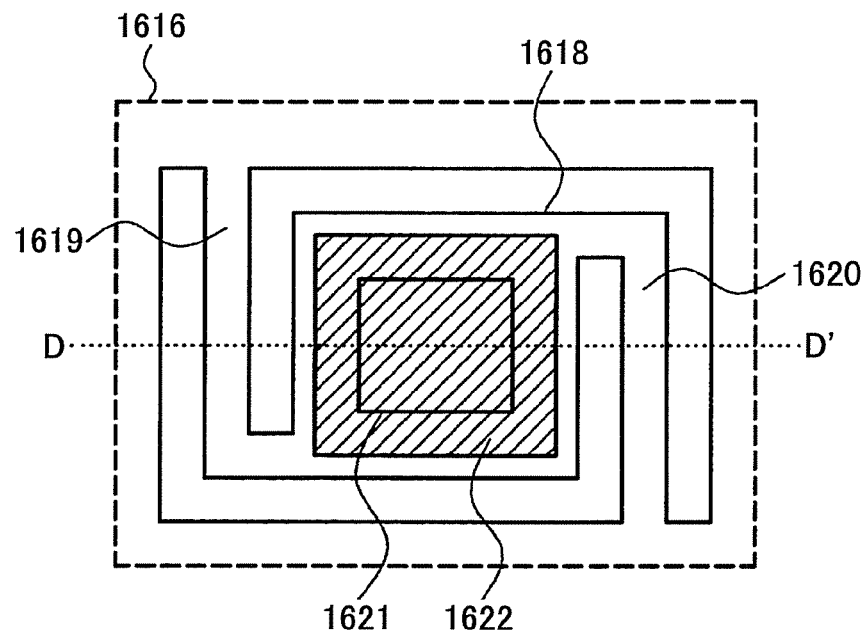
FIG. 16 is a block diagram showing a configuration example of the temperature sensor according to the embodiment of the present invention.

FIG. 16 shows the structure of the work-function-difference-based infrared-ray sensor 1516 having a positive output temperature coefficient shown in FIG. 15A.

In a work-function-difference-based infrared-ray sensor 1616, a work-function-difference-based temperature sensor 1621 and an infrared-ray absorbing film 1622 are formed on a bridge-shaped heat insulating structure in which beams 1619 and 1620 support a membrane 1618 in a substrate hollow space.

Note that the heat insulating structure may be formed into various shapes on a silicon (Si) substrate in an MEMS process or the like. The shape, the number of beams, the size, and the like of the heat insulating structure are not limited to those shown in FIG. 16.

Figure 17:
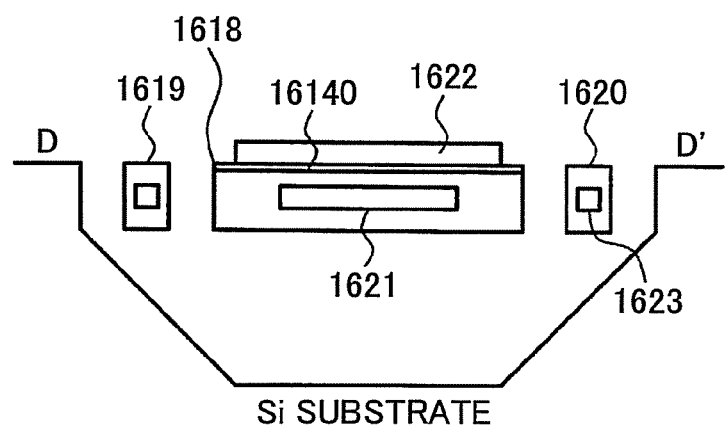
FIG. 17 is a cross-sectional view showing an example of the cross section of the temperature sensor according to the embodiment of the present invention.

FIG. 17 shows a cross-section taken along lines D-D' in the work-function-difference-based infrared-ray sensor 1616 shown in FIG. 16. Inside the beams 1619 and 1620, a wiring 1623 for electrically connecting the work-function-difference-based temperature sensor 1621 with an external circuit is formed.

Further, the work-function-difference-based temperature sensor 1621 is formed inside the membrane 1618, and the infrared-ray absorbing film 1622 is formed on the front surface of the membrane 1618.

The infrared-ray absorbing film 1622 is either a film made of golden black, silicon oxide, silicon nitride, or titanium nitride or a film obtained by laminating these substances to each other.

Note that instead of separately forming the infrared-ray absorbing film 1622, the membrane 1618 itself may also serve as an infrared-ray absorbing film.

Further, in order to increase an infrared-ray absorbing ratio, an infrared-ray reflecting film 16140 may be formed beneath the infrared-ray absorbing film 1622 as shown in FIG. 17. Note that the infrared-ray reflecting film 16140 may be formed beneath the infrared-ray absorbing film 1622 with respect to the incident direction of infrared rays.

Further, FIG. 17 shows a case in which infrared rays are incident from the side of the infrared-ray absorbing film 1622. However, in a case in which infrared rays are incident from the side of the Si substrate, the infrared-ray reflecting film 16140 may be formed on the infrared-ray absorbing film 1622.

Further, FIGS. 16 and 17 show the work-function-difference-based infrared-ray sensor 1516 having positive polarity shown in FIG. 15. The work-function-difference-based infrared-ray sensor 1517 having negative polarity is different from the work-function-difference-based infrared-ray sensor 1516 only in that it has the work-function-difference-based temperature sensor having negative polarity. Therefore, the basic structure of the work-function-difference-based infrared-ray sensor is the same as that shown in FIGS. 16 and 17.

Figure 18B:
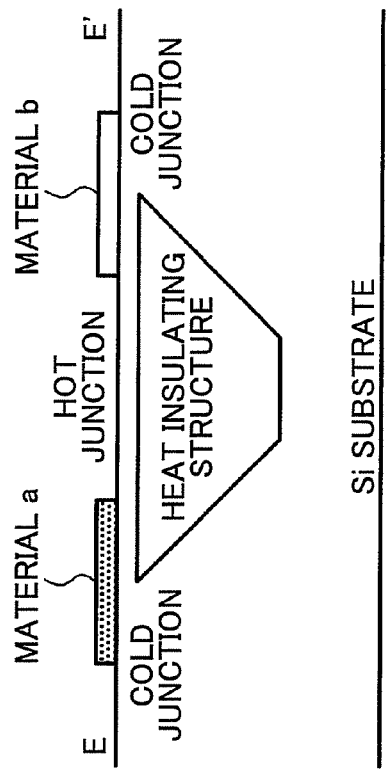
FIGS. 18A and 18B are explanatory diagrams showing a structure example of a conventional thermopile infrared-ray sensor.
Figure 18A:
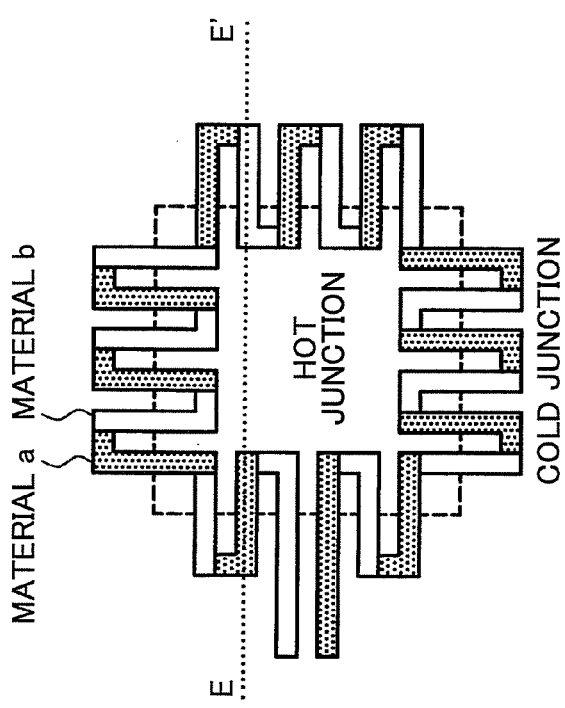

FIGS. 18A and 18B show the structure and the cross section of a thermopile infrared-ray sensor for comparison.

In the case of the thermopile infrared-ray sensor, it is necessary, in principle, to connect a cold junction and a hot junction to each other by a material "a" and a material "b." However, a general-purpose thermopile material has high heat conductivity. Therefore, heat is caused to diffuse through the thermopile material of a heat insulating structure, which in turn degrades the sensitivity of the thermopile infrared-ray sensor.

On the other hand, the work-function-difference-based infrared-ray sensor has the work-function-difference-based temperature sensor on the bridge structure as described above, thereby making it possible to increase its heat insulating property.

Figure 19:
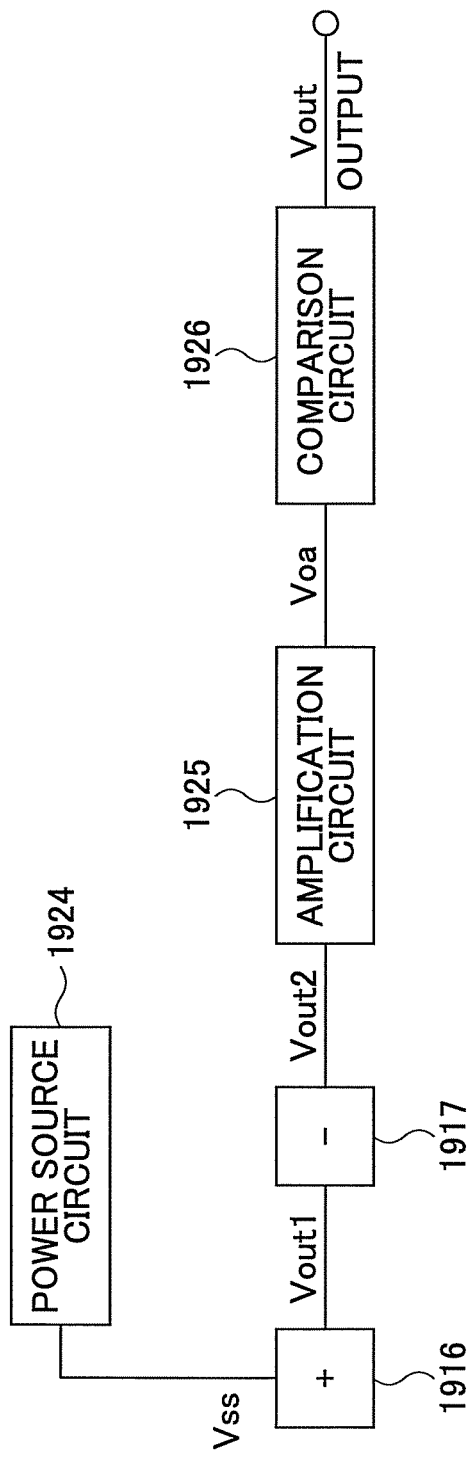
FIG. 19 is a block diagram showing a first circuit configuration example of a work-function-difference-based human-body detecting sensor as a living-body detector according to the embodiment of the present invention.

FIG. 19 shows the circuit configuration of a work-function-difference-based human-body detecting sensor using such a work-function-difference-based infrared-ray sensor. The work-function-difference-based human-body detecting sensor shown here is an example using two elements.

The work-function-difference-based human-body detecting sensor is composed of work-function-difference-based infrared-ray sensors 1916 and 1917; a power source circuit 1924 that supplies driving voltage Vss less than power source voltage Vdd to the work-function-difference-based infrared-ray sensor 1916; an amplification circuit 1925 that amplifies an output from the work-function-difference-based infrared-ray sensor 1917; and a comparison circuit 1926 that compares an output Voa from the amplification circuit 1925 with voltage in a prescribed range and outputs a detection output signal Vout.

Note that the power source voltage Vdd is supplied to the parts other than the work-function-difference-based infrared-ray sensor 1916. Further, since the work-function-difference-based infrared-ray sensors 1916 and 1917 are specifically described above, their descriptions are omitted here.

According to the circuit configuration of the work-function-difference-based human-body detecting sensor in this example, the sum of the outputs of the work-function-difference-based infrared-ray sensors 1916 and 1917 is output. Below is described the circuit configuration of the work-function-difference-based human-body detecting sensor.

Figure 21:
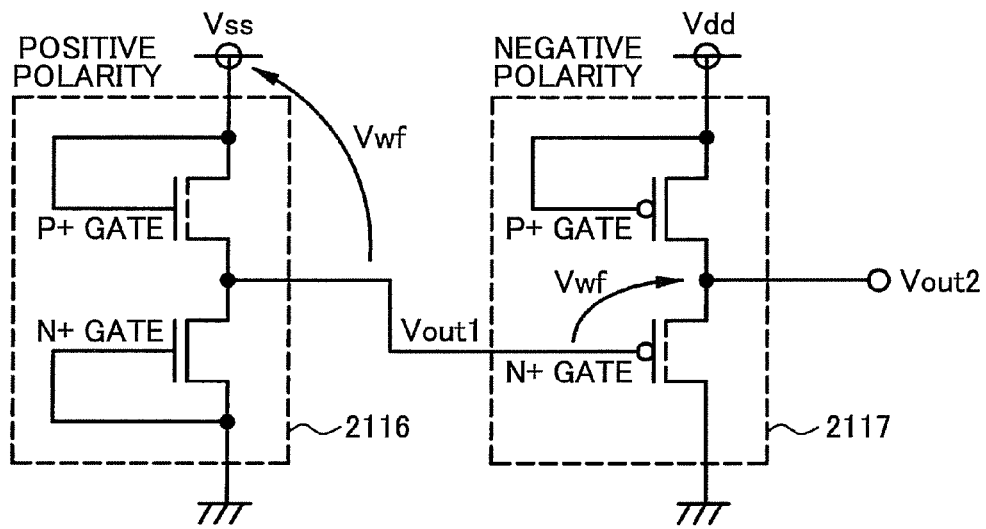
FIG. 21 is a circuit diagram showing a first circuit configuration example of a temperature sensor using a work-function-difference-based radiant-ray detecting element configured to sum up outputs according to the embodiment of the present invention.

FIG. 21 shows an example of the circuit configuration of the work-function-difference-based temperature sensor that outputs a summing signal.

An output Vout1 of a work-function-difference-based temperature sensor 2116 having a positive output temperature characteristic is connected to the gate electrode of the output MOSFET of a work-function-difference-based temperature sensor 2117 having a negative output temperature characteristic.

The characteristic of the work-function-difference-based temperature sensor 2116 having the positive output temperature characteristic is indicated by E in FIG. 7. The work-function-difference-based temperature sensor 2117 having the negative output temperature characteristic is configured such that the PMOS transistor 89 and the PMOS transistor 80 of the work-function-difference-based temperature sensor shown in FIG. 8A are switched with each other, and the characteristic of the work-function-difference-based temperature sensor 2117 is a characteristic obtained by folding the characteristic indicated by G in FIG. 9 at Vdd/2, i.e., the characteristic indicated by F.

Voltage Vss is supplied to the work-function-difference-based temperature sensor 2116 having the positive output temperature characteristic so that the relationship Vss<Vdd is established. As a result, the relationship Vout 1=Vss−Vwf is provided to thereby establish the relationship Vout2=Vout1+Vwf=Vss−Vwf+Vwf=Vss.

That is, if output variations simultaneously occur in both the work-function-difference-based temperature sensor 2116 having the positive output temperature characteristic and the work-function-difference-based temperature sensor 2117 having the negative output temperature characteristic due to thermal interference, the interference is cancelled to thereby make it possible to prevent the interference from being erroneously detected as human bodies.

This configuration eliminates the necessity for providing a summing circuit to thereby make it possible to reduce a circuit area.

Note that if the power source voltage Vdd is supplied to the work-function-difference-based temperature sensor 2116 having the positive output temperature characteristic, the relationship Vout2=Vdd is established to thereby disable the work-function-difference-based temperature sensor 2117 having the negative output temperature characteristic. Therefore, in this case, the voltage Vss (Vdd) is required to be supplied to the work-function-difference-based temperature sensor 2116 having the positive output temperature characteristic using a power source circuit 2124.

Figure 22:
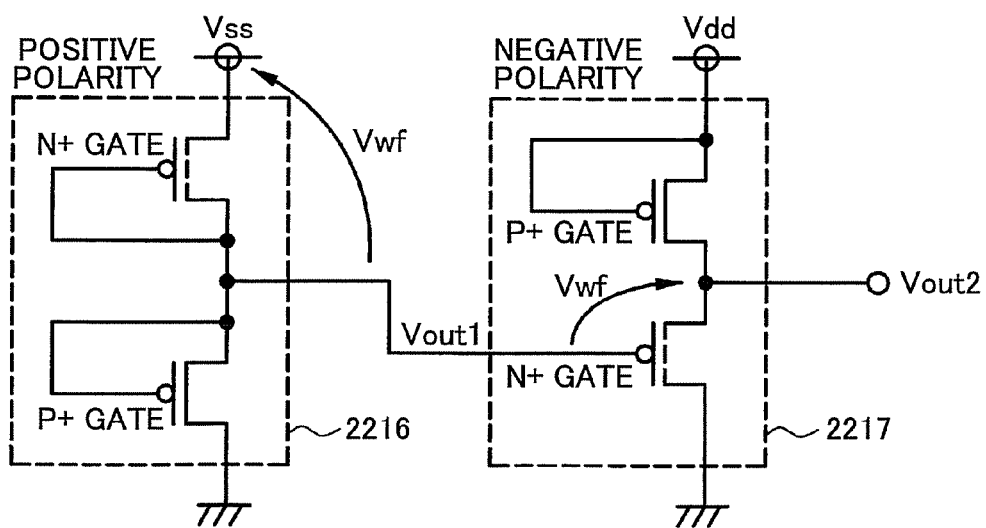
FIG. 22 is a circuit diagram showing a second circuit configuration example of the temperature sensor using the work-function-difference-based radiant-ray detecting element configured to sum up outputs according to the embodiment of the present invention.
Figure 23:
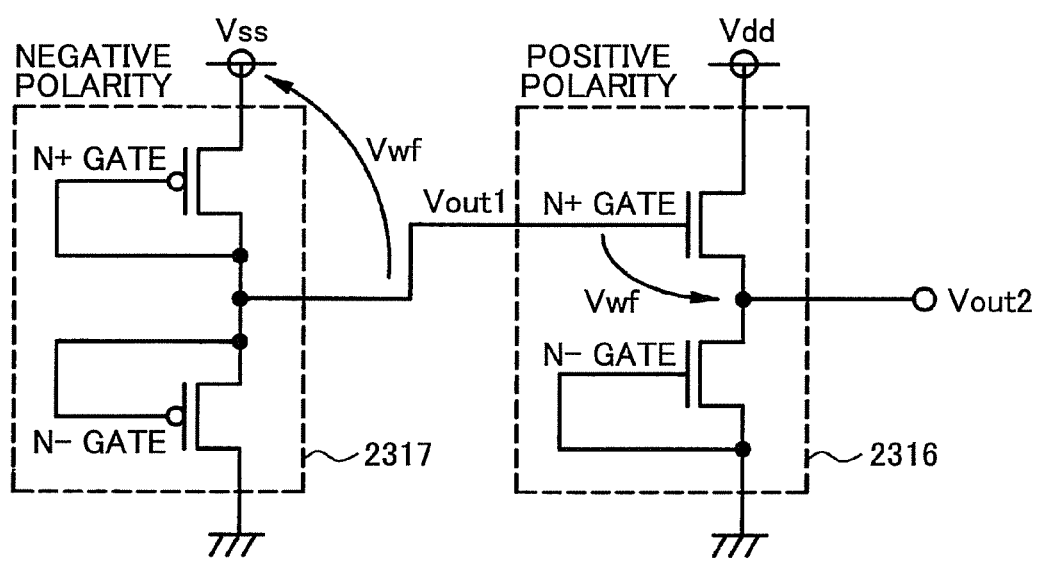
FIG. 23 is a circuit diagram showing a third circuit configuration example of the temperature sensor using the work-function-difference-based radiant-ray detecting element configured to sum up outputs according to the embodiment of the present invention.

FIGS. 22 and 23 show other examples of the circuit configuration.

Note that each of the work-function-difference-based temperature sensors shown in FIGS. 21, 22, and 23 is configured to supply the voltage Vss smaller than Vdd to the sensor of the first stage, but may supply the voltage Vdd to the sensor of the first stage and the voltage Vss greater than Vdd to the sensor of the second stage. In this case, however, the voltage Vss is also required to be supplied to the amplification circuit and the comparison circuit of the subsequent stages.

As described above, the power source circuit 1924 shown in FIG. 19 aims to supply the voltage Vss smaller than the power source voltage Vdd to the work-function-difference-based infrared-ray sensor 1916.

The configuration of the power source circuit 1924 may be of a general-purpose type. If a stabilized power source is supplied from outside, it may only be required to divide the voltage of the power source by resistances.

The amplification circuit 1925 shown in FIG. 19 amplifies the output Vout2 from the work-function-difference-based infrared-ray sensor 1917. However, since the output Vout2 has a DC component, the amplification circuit 1925 is required to have the function of canceling the DC component.

For example, the amplification circuit 1925 is required to subtract the DC component using a reference voltage source to amplify the output or eliminate the DC component using a HPF (High-pass filter). Further, since the frequency of a signal is low in the human-body detecting sensor, the amplification circuit 1925 may take a difference with a previous signal to eliminate the DC component.

Figure 20:
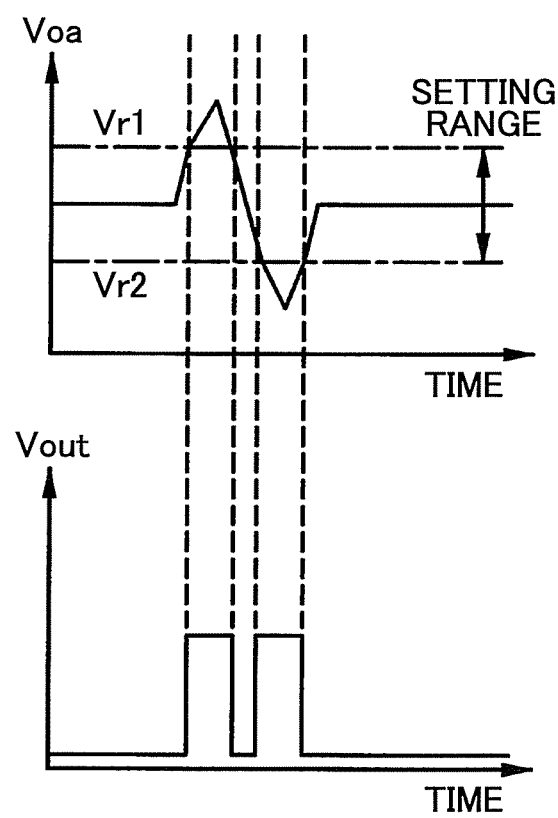
FIG. 20 is a circuit diagram showing an operations example of a comparison circuit shown in FIG. 19.

FIG. 20 shows the operations of the comparison circuit 1926 shown in FIG. 19. The comparison circuit 1926 compares an output Voa from the amplification circuit 1925 with voltage in a prescribed range. If the output Voa exceeds the voltage in the prescribed range, the comparison circuit 1926 may output a human-body detecting signal. For example, the comparison circuit 1926 may compare the output Voa with the output Vr1 and compare the output Voa with the output Vr2 by using two comparators and sum up the outputs to provide the output Vout, but a technology for providing the output Vout is not particularly limited.

Figure 24:
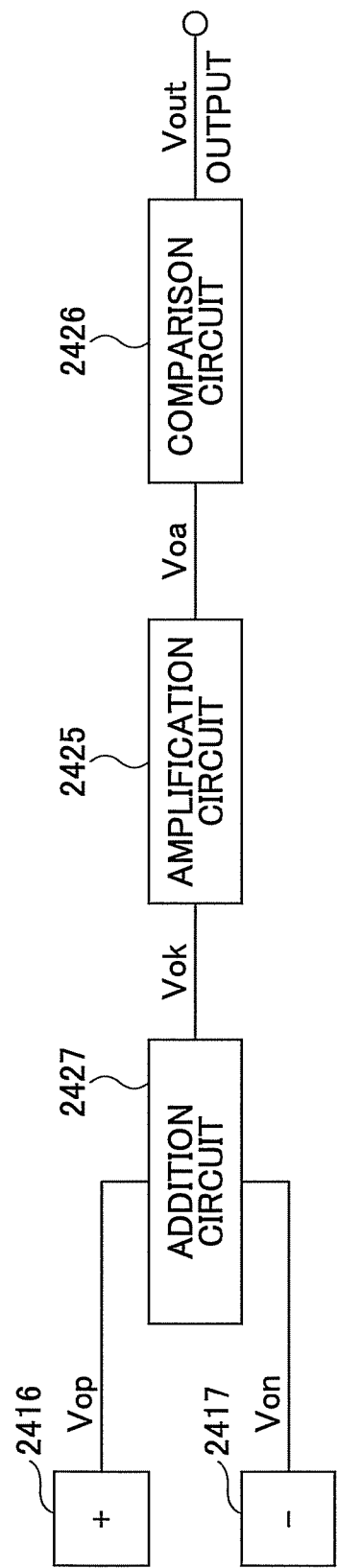
FIG. 24 is a block diagram showing a second circuit configuration example of the work-function-difference-based human-body detecting sensor as the living-body detector according to the embodiment of the present invention.

Next, FIG. 24 shows the configuration of summing up an output from a work-function-difference-based temperature sensor 2416 having a positive output temperature coefficient and an output from a work-function-difference-based temperature sensor 2417 having a negative output temperature coefficient by a summing circuit 2427.

Note that the summing circuit 2427 is not required to have a special configuration, and a general-purpose summing circuit using an operational amplifier or the like may be used. Thus, the summing circuit 2427 facilitates the provision of multiple elements in the sensor.

Further, the provision of a DC-offset adjustment function or the like in the summing circuit 2427 eliminates the power source circuit 1924 shown in FIG. 19.

Figure 25:
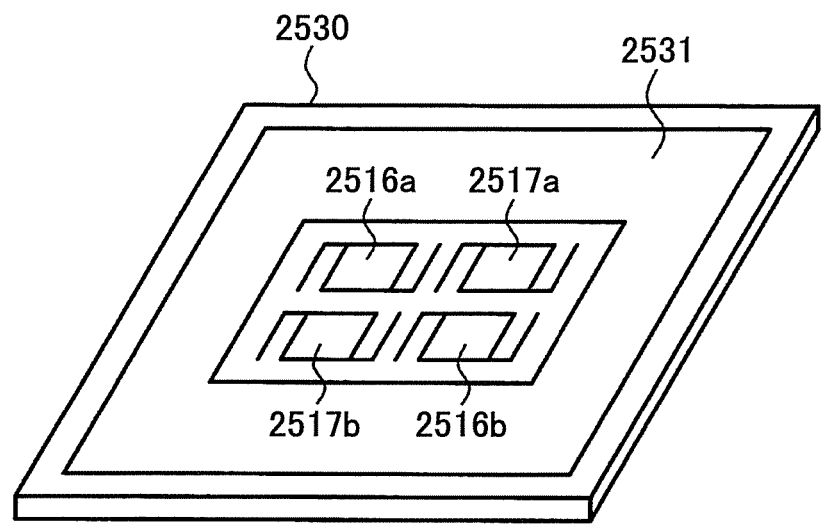
FIG. 25 is a block diagram showing a configuration example of a work-function-difference-based human-body detecting sensor as a living body detector integrated into one chip according to the embodiment of the present invention.
Figure 26:
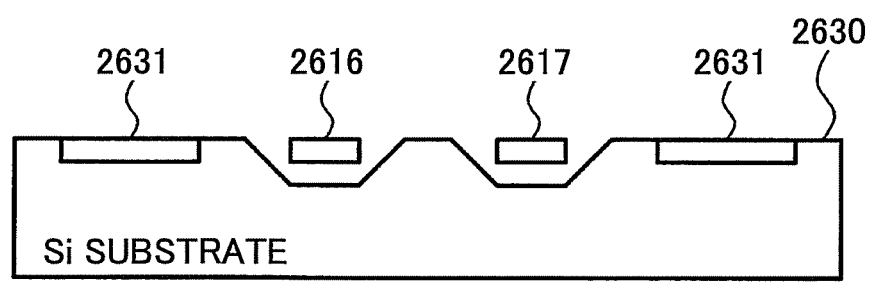
FIG. 26 is a cross-sectional view showing an example of the cross-sectional structure of the work-function-difference-based human-body detecting sensor as the living-body detector integrated into one chip in FIG. 25.

Next, FIGS. 25 and 26 show an example of a one-chip configuration in which a work-function-difference-based infrared-ray sensor serving as the constituent of a human-body detecting sensor and a peripheral circuit are mounted on a silicon (Si) substrate.

FIG. 25 shows the work-function-difference-based human-body detecting sensor having the one-chip configuration. The work-function-difference-based infrared-ray sensors 2516a, 2516b, 2517a, and 2517b are formed on a work-function-difference-based human-body detecting sensor chip made of a silicon (Si) substrate, and the peripheral circuit 2531 is formed around the work-function-difference-based human-body infrared-ray sensors 2516a, 2516b, 2517a, and 2517b.

FIG. 26 shows a cross section of a work-function-difference-based human-body detecting sensor having a one-chip configuration. In the work-function-difference-based infrared-ray sensor, infrared-ray detecting parts 2616 and 2617 are composed of MOSFETs. Therefore, the infrared-ray detecting parts 2616 and 2617 can be formed together with a peripheral circuit 2631 on a silicon (Si) substrate 2630 in a CMOS process.

Thus, the one-chip configuration not only enables the miniaturization of the work-function-difference-based human-body detecting sensor but also eliminates the process of bonding together a substrate on which only sensor elements are formed and a substrate on which only a circuit part is formed, which in turn provides a large cost-reduction effect.

Figure 27:
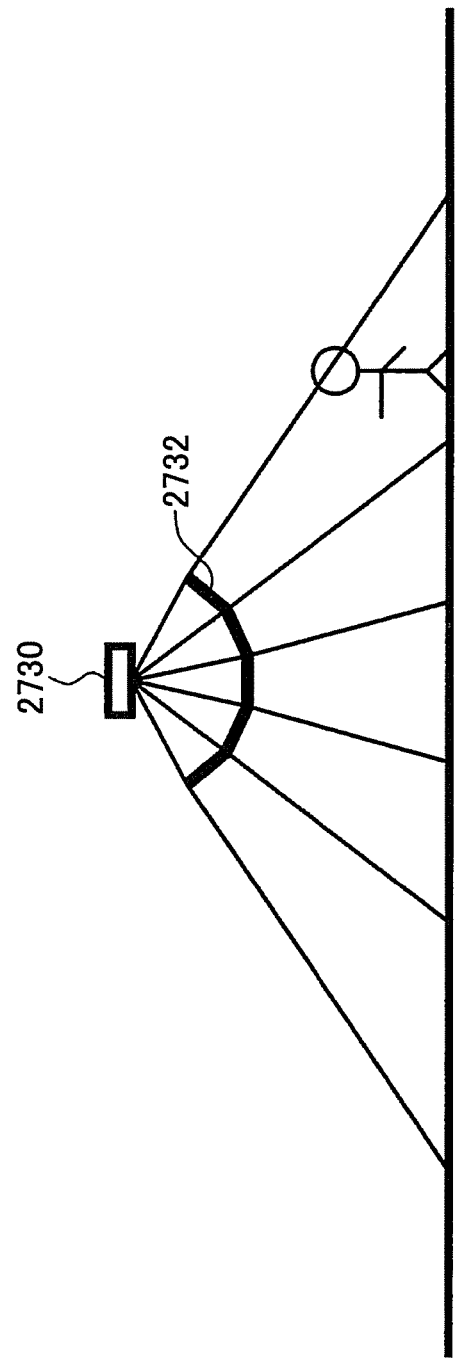
FIG. 27 is an explanatory diagram showing an example of detecting operations by the living-body detector according to the embodiment of the present invention.

Referring next to FIG. 27, a description is made of a configuration in which the work-function-difference-based human-body detecting sensor described above is provided with an infrared-ray lens 2732 that condenses infrared rays.

FIG. 27 shows the infrared-ray lens 2732 and a detecting area. The infrared-ray lens 2732 is of a type generally used in a human-body detecting sensor and designed to divide the detecting area and condense infrared rays from each of the divided detecting areas into the element part of a human-body detecting sensor 2730.

Thus, the condensing of infrared rays with the infrared-ray lens 2732 can increase the sensitivity of the work-function-difference-based human-body detecting sensor. Further, the infrared-ray lens 2732 enables the free setting of the detecting range.

Note that besides the lens shown in FIG. 27, a spot-type lens or the like may be used to detect only a narrow range. Further, the lens may be, but is not limited to, a convex lens, a Fresnel lens, or the like.

As described above referring to FIGS. 1 through 27, this example provides the temperature sensor, which uses a work-function-difference-based radiant-ray detecting element that outputs a work function difference between the gate electrodes of first and second field-effect transistors detecting infrared rays as a detection signal of the radiant rays, has at least a pair of a first work-function-difference-based radiant-ray detecting element (1516) having a positive output temperature coefficient and a second work-function-difference-based radiant-ray detecting element (1517) having a negative output temperature coefficient of which the absolute value is equal to the absolute value of the first-difference-based radiant-ray detecting element (1516).

In particular, each of the first and second work-function-difference-based radiant-ray detecting elements (1516 and 1517) has one or more MOSFETs (45, 47, 65, and 66) functioning as a current source and one or more MOSFETs (46, 48, 80 through 82, and 89) for outputting a work function difference connected between a power source and the ground. In addition, each of the first and second work-function-difference-based radiant-ray detecting elements (1516 and 1517) is so arranged that the MOSFETs functioning as the current source and the MOSFETs for outputting a work function difference are connected in a reverse order between the power source and the ground.

Alternatively, each of the first and second work-function-difference-based radiant-ray detecting elements (1516 and 1517) is composed of plural MOSFETs, and the MOSFETs constituting the first work-function-difference-based radiant-ray detecting element (1516) and the MOSFETs constituting the second work-function-difference-based radiant-ray detecting element (1517) are different in their channel conductivity types.

Note that the first work-function-difference-based radiant-ray detecting element (1516) composed of the MOSFETs has plural PMOS transistors. The gate of one of the plural PMOS transistors is different in the conductivity type from those of the other of the plural PMOS transistors. Further, the second work-function-difference-based radiant-ray detecting element (1517) is composed of plural NMOS transistors. The gate of one of the plural NMOS transistors is different in the conductivity type from those of the other of the plural NMOS transistors.

Alternatively, the first work-function-difference-based radiant-ray detecting element (1516) composed of the MOSFETs has plural NMOS transistors. The gate of one of the plural NMOS transistors is the same in the conductivity type as but different in an impurity concentration from those of the other of the plural NMOS transistors. The second work-function-difference-based radiant-ray detecting element 1517 has plural PMOS transistors. The gate of one of the plural PMOS transistor is the same in the conductivity type as but different in the impurity concentration from those of the other of the plural PMOS transistors.

Further, a heat insulating structure (1618) and an infrared-ray absorbing film (1622) are provided in the temperature sensor. On the heat insulating structure (1618), a temperature sensor (1621) composed of the first and second work-function-difference-based radiant-ray detecting elements (1516 and 1517) and the infrared-ray absorbing film (1622) are provided.

Further, the output of a work-function-difference from the first work-function-difference-based radiant-ray detecting elements (2116 and 2216) is input to the gates of second work-function-difference-based radiant-ray detecting element (2117 and 2217). In addition, voltage less than the power source voltage of the second work-function-difference-based radiant-ray detecting elements (2117 and 2217) is supplied to the first work-function-difference-based detecting elements (2116 and 2216).

Conversely, the output of a work function difference from a second work-function-difference-based radiant-ray detecting element (2317) is input to the gate of a first work-function-difference-based radiant-ray detecting element (2316). In addition, voltage less than the power source voltage of the first work-function-difference-based radiant-ray detecting element (2316) is supplied to the second work-function-difference-based radiant-ray detecting element (2317).

Further, the temperature sensor having such a configuration is provided in a work-function-difference-based human-body detecting sensor (living-body detector) that detects radiation rays from a human body to detect the same. In the work-function-difference-based human-body detecting sensor (living-body detector), an amplification circuit (1925) amplifies an output signal from temperature sensors (1916 and 1917), and a comparison circuit (1926) outputs a detection signal if an output from the amplification circuit (1925) exceeds a prescribed voltage range.

Note that if the temperature sensor according to the embodiment of the present invention having no configuration described above is used in the work-function-difference-based human-body detecting sensor (living-body detector), a summing circuit (2427) is provided that sums up an output from a first work-function-difference-based radiant-ray detecting element (2416) and an output from a second work-function-difference-based radiant-ray detecting element (2417) constituting the temperature sensor. An amplification circuit (2425) amplifies an output signal from the summing circuit (2427), and a comparison circuit (2426) outputs a detection signal if an output from the amplification circuit (2425) exceeds a prescribed voltage range.

Further, in the work-function-difference-based human-body detecting sensor (living-body detector), temperature sensors (2616 and 2617) and a peripheral circuit (2631) such as the summing circuit, the amplification circuit, and the comparison circuit are integrated into one chip on a silicon (Si) substrate (2630).

Further, in the work-function-difference-based human-body detecting sensor (living-body detector), an optical system (infrared-ray lens 2732) that condenses radiation rays from a living body is provided.

Thus, it is possible to solve the conventional problem (i.e., a sensor that detects a static living body with a simple configuration and high precision without being affected by thermal interference cannot be easily manufactured) and manufacture a high-precision and small-sized temperature sensor at low cost.

In other words, this example uses the work-function-difference-based temperature sensor.

(1) Since the work-function-difference-based temperature sensor is of a DC type that detects the amount of incident infrared rays, it can detect a still human body.

(2) Further, since the work-function-difference-based temperature sensor eliminates the connection of a hot junction and a cold junction of a thermopile material required in the case of a thermopile, it can obtain a high heat insulating property.

(3) Further, the work-function-difference-based temperature sensor having positive polarity or negative polarity can be separately manufactured in such a manner that the connecting order of the MOSFETs constituting the sensor is changed or the MOSFETs constituting the sensor are composed of the NMOS transistors or the PMOS transistors. Therefore, it is very easily to manufacture the sensor having positive polarity or negative polarity.

(4) Further, the output temperature coefficient of the work-function-difference-based temperature sensor is determined based on a work function difference between the polysilicon gates of the plural MOSFETs constituting the sensor. Therefore, controlling the ion implantation of impurities into the polysilicon gates makes it possible to easily equalize the absolute values of the output temperature coefficients of the sensor having positive polarity and the sensor having negative polarity.

Thus, it is possible to solve the following problems in a conventional multi-element human-body detecting sensor; a first problem accompanying the use of a pyroelectric element is that a chopper is required to detect a static living body, a second problem accompanying the use of a thermopile is that a heat insulating property is poor and sensitivity becomes low because a hot junction and a cold junction are connected to each other by the material of the thermopile, and a third problem accompanying the use of a bolometer or a thermistor is that it is hard to equalize the absolute values of positive and negative output temperature coefficients because the positive-polarity and negative-polarity sensors are required to be made of the same material.

Moreover, since the work-function-difference-based temperature sensor can be basically manufactured in a general-purpose CMOS process, it is easily integrated with an amplification circuit or a control circuit.

Note that the embodiment of the present invention is not limited to the example described with reference to FIGS. 1 through 27, but variations and modifications thereof may be made without departing from the scope of the present invention. For example, the embodiment exemplifies the human-body detecting sensor that detects infrared rays from human bodies. However, the embodiment may also be applied to anything that detects radiation rays from other living bodies other than the human bodies.

The present application is based on Japanese Priority Application No. 2009-298728 filed on Dec. 28, 2009, the entire contents of which are hereby incorporated herein by reference.

What is claimed is:

1. A temperature sensor using a work-function-difference-based radiant-ray detecting element that outputs, as a detecting signal of radiant rays, a work function difference between gate electrodes of first and second field-effect transistors sensing the radiant rays, the temperature sensor comprising at least a pair of:

a first work-function-difference-based radiant-ray detecting element having a positive output temperature coefficient; and
a second work-function-difference-based radiant-ray detecting element having a negative output temperature coefficient of which an absolute value is equal to an absolute value of the output temperature coefficient of the first work-function-difference-based radiant-ray detecting element.

2. The temperature sensor according to claim 1, wherein
each of the first and second work-function-difference-based radiant-ray detecting elements has one or more MOSFETs functioning as a current source and one or more MOSFETs for outputting the work function difference connected between a power source and a ground, and
the first and second work-function-difference-based radiant-ray detecting elements are so arranged that the MOSFETs functioning as the current source and the MOSFETs for outputting the work function difference are connected in a reverse order between the power source and the ground.

3. The temperature sensor according to claim 2, wherein
a heat insulating structure and a radiation-ray absorbing film are provided, and
the first and second work-function-difference-based radiant-ray detecting elements and the radiation-rays absorbing film are provided on the heat insulating structure.

4. The temperature sensor according to claim 2, wherein
an output of the work function difference from the first work-function-difference-based radiant-ray detecting element is input to a gate of the second work-function-difference-based radiant-ray detecting element, and
a voltage smaller than a power source voltage of the second work-function-difference-based radiant-ray detecting element is supplied to the first work-function-difference-based radiant-ray detecting element.

5. A living body detector that detects radiation rays from a living body to detect the same, the living body detector comprising:
the temperature sensor according to claim 4; and
a peripheral circuit including an amplification circuit that amplifies an output signal from the temperature sensor and a comparison circuit that outputs a detection signal if an output from the amplification circuit exceeds a prescribed voltage range.

6. The living body detector according to claim 5, further comprising:
an optical system that condenses the radiation rays from the living body.

7. The temperature sensor according to claim 2, wherein
an output of the work function difference from the second work-function-difference-based radiant-ray detecting element is input to a gate of the first work-function-difference-based radiant-ray detecting element, and
a voltage smaller than a power source voltage of the first work-function-difference-based radiant-ray detecting element is supplied to the second work-function-difference-based detecting element.

8. A living body detector that detects radiation rays from a living body to detect the same, the living body detector comprising:
the temperature sensor according to claim 2; and
a peripheral circuit including a summing circuit that sums up an output from the first work-function-difference-based radiant-ray detecting element constituting the temperature sensor and an output from the second work-function-difference-based radiant-ray detecting element, an amplification circuit that amplifies an output signal from the summing circuit, and a comparison circuit that outputs a detection signal if an output from the amplification circuit exceeds a prescribed voltage range.

9. The living body detector according to claim 8, wherein the temperature sensor and the peripheral circuit are integrated into one chip.

10. The temperature sensor according to claim 1, wherein each of the first and second work-function-difference-based radiant-ray detecting elements is composed of plural MOSFETs, and the MOSFETs constituting the first work-function-difference-based radiant-ray detecting element and the MOSFETs constituting the second work-function-difference-based radiant-ray detecting element are different in their channel conductivity types.

11. The temperature sensor according to claim 10, wherein the first work-function-difference-based radiant-ray detecting element is composed of plural PMOS transistors, a gate of one of the plural PMOS transistors is different in the conductivity type from gates of the other of the plural PMOS transistors, the second work-function-difference-based radiant-ray detecting element is composed of plural NMOS transistors, and a gate of one of the plural NMOS transistors is different in the conductivity type from gates of the other of the plural NMOS transistors.

12. The temperature sensor according to claim 10, wherein the first work-function-difference-based radiant-ray detecting element is composed of plural NMOS transistors, a gate of one of the plural NMOS transistors is the same in the conductivity type as but different in an impurity concentration from gates of the other of the plural NMOS transistors, the second work-function-difference-based radiant-ray detecting element is composed of plural PMOS transistors, and a gate of one of the plural PMOS transistors is the same in the conductivity type as but different in the impurity concentration from gates of the other of the plural PMOS transistors.

\* \* \* \* \*